United States Patent [19]

Termes

[11] 4,214,821
[45] Jul. 29, 1980

[54] TOTAL ENVIRONMENT PHOTOGRAPHIC MOUNT AND PHOTOGRAPH

[76] Inventor: Richard A. Termes, Rt. 2, Box 435B, Spearfish, S. Dak. 57783

[21] Appl. No.: 956,031

[22] Filed: Oct. 30, 1978

[51] Int. Cl.² ............................................. G03B 37/00
[52] U.S. Cl. ..................................... 352/70; 352/69; 354/293
[58] Field of Search ............... 354/293, 354, 295, 296; 352/69-71; D16/11, 17, 18, 83

[56] References Cited

U.S. PATENT DOCUMENTS

| | | | |
|---|---|---|---|
| 3,118,340 | 1/1964 | Iwerks | 352/70 |
| 3,687,530 | 8/1972 | Watanuki | 352/71 |

FOREIGN PATENT DOCUMENTS 1047728  8/1963  United Kingdom ..................... 352/70

OTHER PUBLICATIONS

Gessler, *Camera*, 43rd year, No. 6, Jun. 1964, "Polyvision", pp. 13-18.

*Primary Examiner*—Richard A. Wintercorn
*Assistant Examiner*—Shelley Wade
*Attorney, Agent, or Firm*—Thomas John Furois

[57] ABSTRACT

A device for taking a series of photographs, each in reference to one of the faces of a regular polyhedron. The photographs are then printed and the prints are trimmed to the appropriate configuration in relation to the geometry of the faces of the polyhedron used. Trimming of the prints requires that the edges of adjacent prints result in images which are continuous. The prints are then mounted to form a continuous photograph in the form of a regular polyhedron similar to the polyhedron used as a camera mount to take the series of photographs.

4 Claims, 14 Drawing Figures

TOTAL ENVIRONMENT PHOTOGRAPHIC MOUNT AND PHOTOGRAPH

BACKGROUND OF THE INVENTION

1. Field of the invention.

This invention relates to the field of photography and is particularly concerned with camera mounting devices and composite photographs composed of a plurality of interrelated photographs.

2. Description of the prior art.

Conventional camera mounts normally provide for positioning the camera about some pivot point. Specialized mounts may provide for controlled panning of the camera about some point restricting the movement of the camera to one plane. Other specialized mounts are available which permit the camera to be offset laterally some specific distance or to be panned to some specific angle to permit the taking of stereoscopic photographs. The present invention relates to a camera mount and resulting composite photographs which are in relation to the faces of a regular polyhedron.

SUMMARY OF THE INVENTION

The present invention consists of a total environment photographic camera mount, mounted upon a photographic tripod or similar support, in the form of a regular polyhedron. Each of the plurality of faces of the regular polyhedron is used as a photographic reference plane. this is accomplished by mounting a suitable camera to a bracket which is affixed to each of the polyhedron faces. A photograph is taken using each of the polyhedron faces as a photographic reference plane. The photographs are then printed and trimmed for mounting. By determining the geometric center of each print and placing adjacent photographs so that their image coincide, trim lines are established which permit the trimmed prints to be assembled into the form of a regular polyhedron. The completed assembly results in a continuous total environment photograph.

BRIEF DESCRIPTION OF THE DRAWINGS

The novel camera mounting device and resulting total environment photograph of the present invention will be better understood by reference to the following drawings in which the same elements bear the same reference numbers throughout the several drawings.

DESCRIPTION OF THE PREFERRED EMBODIMENTS

Figure 8:
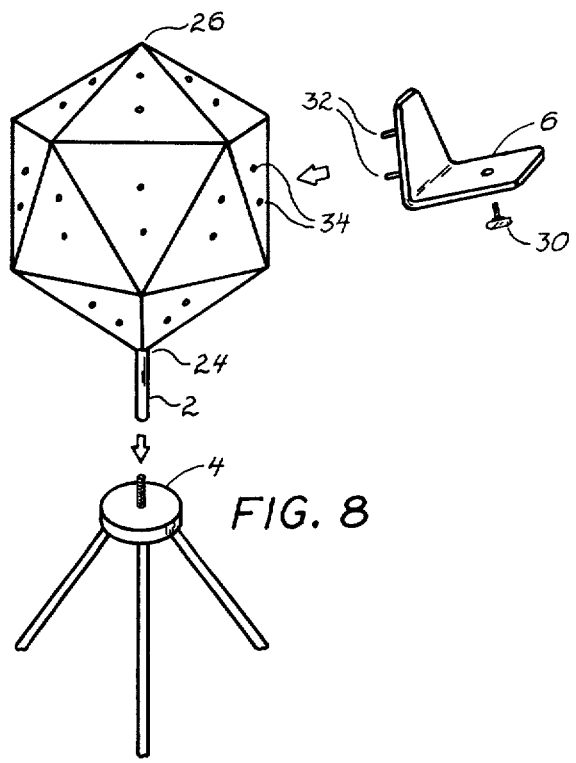
FIG. 8 is an exploded view showing the camera bracket in relationship to the polyhedron camera mount.

Reference is made to FIGS. 1 thru 5 which illustrate regular polyhedrons, each of which is to be used as a camera mount. Each of the plurality of faces of the polyhedron is used to establish a photographic reference plane. The mount may be constructed of wood, metal, plastic, or a fiber-reinforced composite or the like of sufficient strength to support the camera during the photographic process. The polyhedron used is of a size which will provide faces large enough to create bearing surfaces large enough to position and retain a camera and its bracket. A threaded fitting 2 is affixed by suitable means to the polyhedron, projecting in a position to be described later. The threads in the threaded fitting are of a type which will fit any standard photographic tripod 4, as shown in FIG. 8, or any suitable support. Said threads are located in or on the fitting at the end opposite that affixed to the polyhedron. The threaded fitting may be constructed of metal, plastic, or a fiber-reinforced composite or the like, of sufficient strength to support the polyhedron during the photographic process. The threaded fitting must also be of sufficient length to provide clearance for the camera and its bracket 6, reference FIG. 7, to prevent interference with the tripod 4 or support used.

Figure 1:
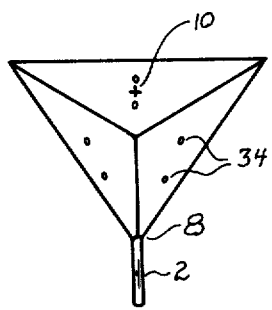
FIG. 1 is a perspective view of the tetrahedron camera mount.
Figure 2:
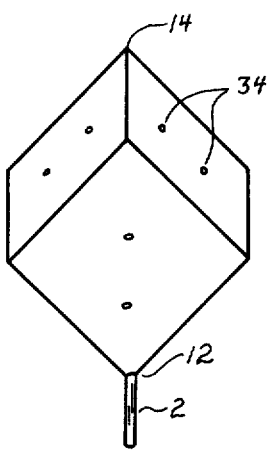
FIG. 2 is a perspective view of the hexahedron camera mount.

FIG. 1 depicts a regular tetrahedron constructed to have four congruent, equilateral triangles as faces. An axis is determined from the vertex 8 to the mid-point 10 of the opposite face. A threaded fitting 2 is affixed by suitable means to the tetrahedron at vertex 8 so that the axis of its threads is coincident with the above established axis. This configuration will permit all the faces of the tetrahedron to be used as photographic reference planes. The threaded fitting may also be affixed perpendicular to one of the tetrahedron faces. This configuration will prevent the use of this face as photographic reference plane but will allow it to be used as a base upon which the composite photograph may rest. FIG. 2 depicts a regular hexahedron constructed to have six congruent squares as faces. An axis is determined from one of the vertices 12 to an opposite vertex 14. A threaded fitting 2 is affixed by suitable means at the vertex 12 so that the axis of its threads is coincident with the above established axis. This configuration will permit all of the faces of the hexahedron to be used as photographic reference planes. The threaded fitting may also be affixed perpendicular to one of the hexahedron faces permitting that face to be used as a base.

Figure 3:
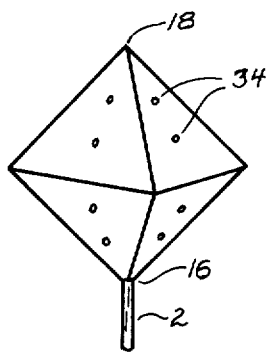
FIG. 3 is a perspective view of the octahedron camera mount.

FIG. 3 depicts a regular octahedron constructed to have eight congruent, equilateral triangles, as faces. An axis is determined from one of the vertices 16 to an opposite vertex 18. A threaded fitting 2 is affixed by suitable means at the vertex 16 so that the axis of its threads is coincident with the above established axis. This configuration will permit all of the faces of the octahedron to be used as photographic reference planes. The threaded fitting may also be affixed perpendicular to one of the hexahedron faces permitting that face to be used as a base.

Figure 4:
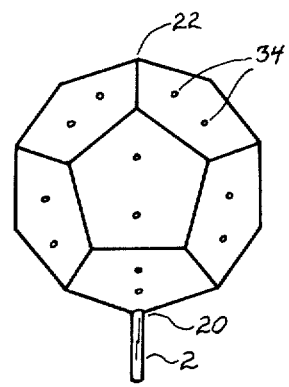
FIG. 4 is a prespective view of the dodecahedron camera mount.

FIG. 4 depicts a regular dodecahedron constructed to have twelve congruent, regular pentagons as faces. An axis is determined from one of the vertices 20 to an opposite vertex 22. A threaded fitting 2 is affixed by suitable means to the vertex 20 so that its threaded axis is coincident with the above established axis of the dodecahedron. This configuration will permit all of the faces to be used as photographic reference planes. The threaded fitting may also be affixed perpendicular to one of the dodecahedron faces permitting that face to be used as a base.

Figure 5:
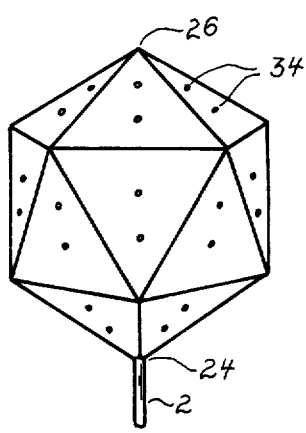
FIG. 5 is a perspective view of the icosahedron camera mount.

FIG. 5 depicts a regular icosahedron constructed of twenty congruent, equilateral triangles. An axis is determined from one of the vertices 24 to an opposite vertex 26. A threaded fitting 2 is affixed by suitable means at the vertex 24 so that the axis of its threads is coincident with the above established axis. This configuration will permit all twenty faces to the dodecahedron to be used as photographic reference planes. The threaded fitting may also be affixed perpendicular to one of the faces permitting that face to be used as a base.

Figure 7:
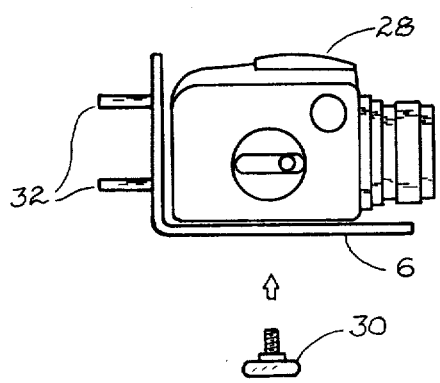
FIG. 7 is a side view of the camera bracket and camera.

A suitable camera 28 is secured to the camera bracket 6 by appropriate retaining means 30 as shown in FIG. 7. The camera bracket 6 may be constructed from either a metal, plastic, or a fiber-reinforced composite or the like of sufficient strength to support the camera during the photographic process. Attaching means 32 is provided to secure the camera bracket to each of the plurality of faces of the polyhedron camera mount, ref. FIG. 8, by engaging with appropriate fittings 34 on the polyhedron mount.

Said attaching means 32 should locate the bracket and camera so that the geometric center of the film frame is coincident with the geometric center of the polyhedron face. The bracket 6 must also position the camera so that the axis of the lens system is perpendicular to and coincident with the geometric center of the polyhedron face to which it is attached.

Figure 6:
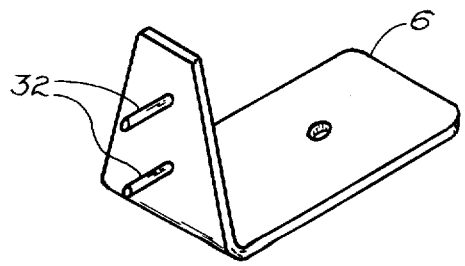
FIG. 6 is a perspective view of the camera bracket.

FIG. 6 is a perspective view of the camera bracket 6 illustrating attaching means 32. Said attaching means must secure the bracket and camera to the polyhedron mount sufficiently steady to permit the photographic process and also provide convenient removal and reattachment of the bracket to each of the plurality of polyhedron faces. This permits a photograph to be taken from each of the polyhedron faces thus creating a total environment photograph.

Figure 9:
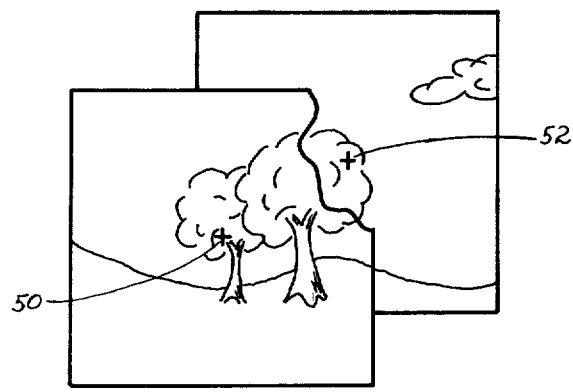
FIG. 9 illustrates two adjacent overlapping prints and their geometric centers.
Figure 10:
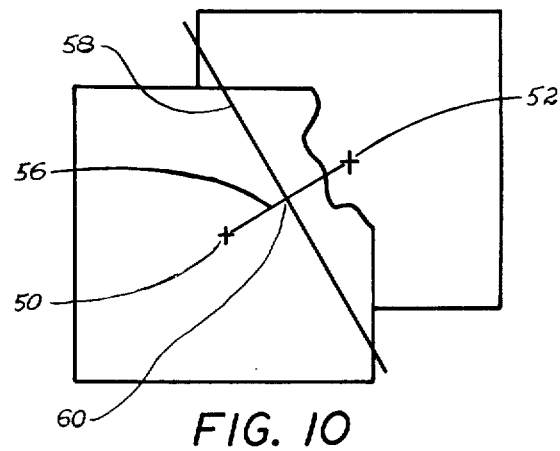
FIG. 10 illustrates the line constructed between the geometric centers of the two adjacent overlapping prints and its perpendicular bisector.
Figure 11:
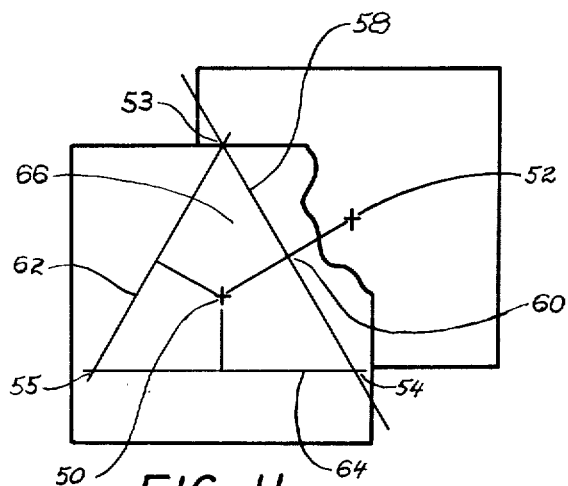
FIG. 11 illustrates the constructed trim lines for one of the prints.

To employ the icosahedron camera mount, the mount is placed in a position that is frozen to the surrounding environment and a photograph is taken from each of the plurality of faces. After developing and printing the geometric center is determined for each of the twenty prints. Take two prints of adjoining images and overlap the prints so that the images coincide as in FIG. 9. Construct a line 56 between the centers, 50, and 52 of the overlapped prints, FIG. 10. Construct a perpendicular bisector 58 to line 56 creating the point of intersection 60. Rotate the line segment between points 50 and 60 one hundred and twenty degrees both clockwise and counterclockwise from its present position about center point 50, FIG. 11. Construct lines 62 and 64 perpendicular to the ends of the rotated line segments constructing the equilateral triangle 66 bounded by lines 58, 62, and 64. The vertices 53, 54, and 55 of the equilateral triangle are the points of intersection of the lines 58, 62, and 64.

Figure 12:
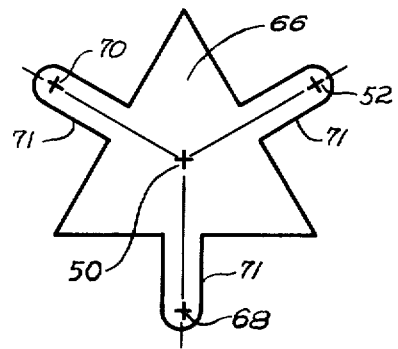
FIG. 12 illustrates the template used to determine the trim lines for the remaining photographs.

Once the size of the equilateral triangle is determined by the above procedure a template, preferably of a transparent material, is constructed of the same size and configuration, FIG. 12. The reference point 50 is marked upon the template at the geometric center of the equilateral triangle. Three tabs 71 are extended from and perpendicular to the midportion of each of the triangle sides of sufficient length to contain reference points 52, 68, and 70. Said reference points 52, 68, and 70 are the center points of the adjoining overlapped images. Hence the center points lie on the three lines which pass through point 50 and are perpendicular to the sides of the equilateral triangle 66. The distance of points 52, 68, and 70 from point 50 is equal to twice the length of a line constructed from point 50 and perpendicular to each of the sides of the equilateral triangle 66.

Figure 13:
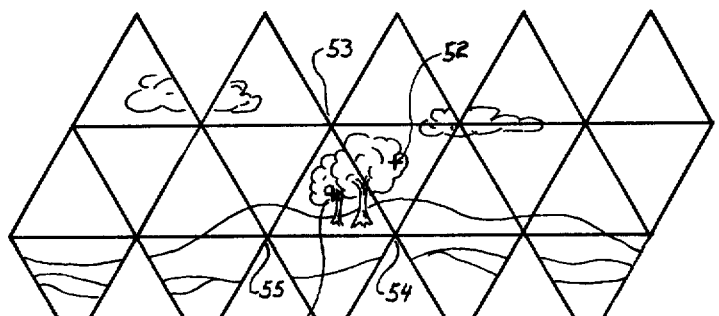
FIG. 13 is a view of all twenty trimmed prints placed in relation to each other.

The template is then employed by placing it over two adjacent overlapping images so that point 50 on the template coincides with the geometric center point of the print to be trimmed and one of the three reference points 52, 68, or 70 is coincident with the center point of the adjacent overlapping print. The print is then trimmed to the size and shape of the template and the process is repeated for each of the remaining prints. The trimmed prints may then be placed relative to each other as shown in FIG. 13.

Figure 14:
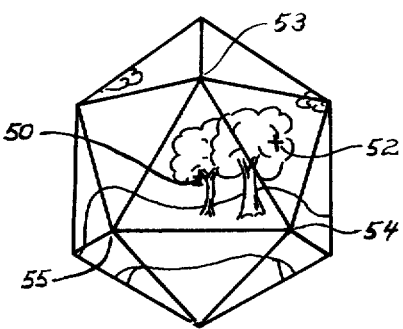
FIG. 14 is a view of the completed total environment photograph.

To complete the total environment photograph, FIG. 14, the prints are joined to form an icosahedron. The icosahedron is completed by bonding together the adjacent edges of the prints by a suitable means or by mounting the prints upon an armature of suitable construction. The photographic image across the transition of adjacent edges of said joined prints being continuous.

The same procedure as described would be employed to create total environment photographs using a tetrahedron or octahedron camera mount, only the number of triangles would differ. The use of the hexahedron will differ in that six squares will be used in place of triangles. A perpendicular bisector of the line constructed between the geometric center points of adjacent overlapping prints will still be used. However the line segment from the geometric center of the upper print and perpendicular to said perpendicular bisector will be rotated in ninety degree increments and these positions will be used to construct a square. A template will then be constructed consisting of a square and four tabs extending outwardly from the midportion of each of the four sides. Said tabs will be of sufficient length to contain the geometric center points of each adjacent overlapped print. This template will then be used to trim the remaining prints. Said trimmed prints will then be assembled to complete the total environment photograph.

The use of the dodecahedron will differ in that twelve regular pentagons will be used. Again a perpendicular bisector of the line constructed between the geometric center points of adjacent overlapping prints will be used. However the line segment from the geometric center point of the upper overlapped print and perpendicular to the said perpendicular bisector will be rotated in seventy two degree increments and these positions will be used to construct a regular pentagon. A template will then be constructed consisting of a regular pentagon with five tabs extending outwardly from the midportion of each of the five sides. Said tabs will be of sufficient length to contain the geometric center points of each adjacent overlapped print. This template will then be used to trim the prints. The prints will then be assembled to complete the total environment photograph.

Care must be taken to insure that a camera lens of sufficient photograph width is used to capture the entire image. A wider lense will be necessary when using the tetrahedron mount than will be required for the icosahedron mount.

I claim:

1. A method of manufacturing a total environment photograph comprising:

exposing a plurality of photographs in reference to each of the plurality of faces upon a camera mount in the form of a polyhedron;

printing said photographs to a size suitable for the finished assembly;

determining and marking upon the face of said prints the geometric center of each print;

placing two of the said prints which were exposed from adjacent faces of said camera mount so that the images are up and overlapping;

constructing a line between the geometric centers of said overlapped prints;

constructing a perpendicular bisector to said line between said geometric center points;

rotating the line segment between the geometric center point, of the upper print, and the perpendicular bisector one hundred and twenty degrees both clockwise and counter clockwise about the geometric center point on the upper print;

constructing lines perpendicular to said rotated line segments creating a equilateral triangle on the upper print;

constructing a template, from a thin material, of the same size and configuration as said equilateral triangle constructed upon the upper print, said template provided with a central reference point coincident with the geometric center point of said equilateral triangle, said template provided with tabs extending outwardly from the midportion of each of the three sides of said equilateral triangle, said tabs being of sufficient length to contain the geometric center points of adjacent overlapped prints, the location of said geometric center points of adjacent overlapped prints lying upon reference lines extending from said central reference point and perpendicular to each of the sides of said equilateral triangle and at a distance from said central reference point equal to twice the distance from said central reference point to the point where said reference lines intersect the sides of said equilateral triangle;

placing two of the said prints which were exposed from adjacent faces of said camera mount so that the images are up and overlapping;

placing said template upon the upper print so that said central reference point coincides with the geometric center point of said upper print;

rotating said template about said central reference point until the geometric center point contained in one of the outwardly extended tabs coincides with the geometric center point of the lower overlapped prints;

transferring the trim lines to the said upper overlapped print from the edges of the equilateral triangle portion of said templates;

determining the trim lines of the remaining plurality of prints by using the said template as previously described;

trimming the prints by using the said trim lines;

bonding together the edges of adjacently exposed prints resulting in a polyhedron body whereby the photographic image across the transition of adjacent edges of said trimmed prints is continuous.

2. A process as in claim 1 wherein said thin material consists of transparent plastic type material.

3. A method of manufacturing a total environment photograph as in claim 1 wherein said plurality of photographs are exposed in reference to each of the plurality of faces upon a camera mount in the form of a hexahedron;

said template comprising of a four sided square provided with a central reference point coincident with the geometric center point of said square;

said template provided with tabs extending outwardly from the midportion of each of the four sides of said square;

said tabs being of sufficient length to contain the geometric center points of said adjacent overlapping prints;

the location of said geometric center points of adjacent overlapped prints lying upon reference lines extending from said central reference point and perpendicular to each of the sides of said square and at a distance from said central reference point equal to twice the distance from said central reference point to the point where said reference lines intersect the sides of said square.

4. A method of manufacturing a total environment photograph as in claim 1 wherein said plurality of photographs are exposed in reference to each of the plurality of faces upon a camera mount in the form of a dodecahedron;

said template comprising of a five sided, regular pentagon provided with a central reference point coincident with the geometric center point of said pentagon;

said template provided with tabs extending outwardly from the midportion of each of the five sides of said pentagon;

said tabs being of sufficient length to contain the geometric center points of said adjacent overlapped prints;

the location of said geometric center points of adjacent overlapped prints lying upon reference lines extending from said central reference point and perpendicular to each of the sides of said pentagon and at a distance from said central reference point equal to twice the distance from said central reference point to the point where said reference lines intersect the sides of said pentagon.

* * * * *